June 20, 1950  J. O. WHITE  2,512,472
METHOD OF TERMINATING POLYMERIZATION REACTIONS
Filed Nov. 9, 1946
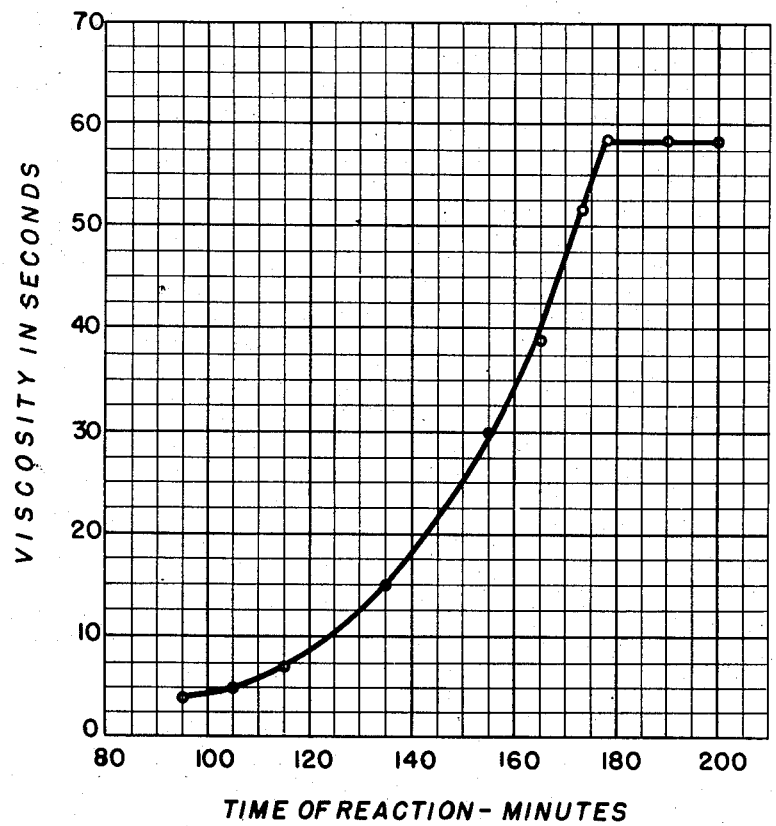
INVENTOR.
JESSE O. WHITE
BY
ATTORNEY Patented June 20, 1950

2,512,472

UNITED STATES PATENT OFFICE 2,512,472

METHOD OF TERMINATING POLYMERIZATION REACTIONS

Jesse O. White, Arlington, N. J., assignor to E. I. du Pont de Nemours & Company, Wilmington, Del., a corporation of Delaware Application November 9, 1946, Serial No. 708,850

8 Claims. (Cl. 260—45.7)

This invention relates to the polymerization of liquid vinyl esters and more particularly to a process of polymerizing liquid vinyl esters in which the polymerization reaction is substantially terminated after partial polymerization of said esters.

Vinyl polymers prepared by conventional methods resulting in practically 100% conversion of the monomeric liquid vinyl esters are characterized by certain undesirable properties such as wide variation in molecular weight. When hydrolyzed, these vinyl polymers yield non-uniform polyvinyl alcohols, which non-uniformity is carried through to the polyvinyl acetals made from these polyvinyl alcohols. Termination of the polymerization reaction prior to substantially complete conversion of liquid vinyl ester monomer to polymer has been found to result in resins free from these undesirable properties. In studying this finding it was discovered that addition of certain amines and phenols terminated the polymerization reaction; however, these compounds were not satisfactory for they produced discoloration in the polymer product. This discoloration was intensified by the distillation of residual liquid vinyl ester monomer from the reaction mass, and also upon further treatment of the vinyl ester polymer in the production of other products such as polyvinyl alcohol and polyvinyl acetals.

An object of this invention is an improved process of polymerizing liquid vinyl esters. A further object is a novel process of preparing vinyl polymers having improved properties. A still further object is such a process in which the polymerization reaction is substantially terminated after partial polymerization of the liquid vinyl ester, thereby yielding a highly uniform polymer free of contaminants and coloring matter. Other objects will be apparent from the description of the invention given hereinafter.

The above objects are accomplished according to the present invention by subjecting a liquid vinyl ester to polymerization conditions in the presence of a catalyst, then substantially terminating the polymerization reaction after partial polymerization of the liquid vinyl ester by adding to the reaction mixture a compound from the group consisting of styrene and substituted styrene. Generally the amount of added styrene or substituted styrene will exceed 0.05% by weight of the liquid vinyl ester and will be added to the reaction mixture before 90% conversion of the monomeric liquid vinyl ester to polymer. After the reaction has been substantially terminated through addition of styrene or substituted styrene, the residual liquid vinyl ester may be removed by distillation or other convenient means. Furthermore, if desired, the added styrene or substituted styrene may also be removed in like manner. This invention is applicable to solution, granulation and emulsion polymerization of liquid vinyl esters.

The following examples, in which parts are by weight unless otherwise indicated, illustrate specific embodiments of this invention.

EXAMPLE I

*Vinyl acetate polymerization terminated with alpha methyl styrene*

| | Parts |
|---|---|
| Vinyl acetate | 900.0 |
| Methanol | 100.0 |
| Benzoyl peroxide | 1.8 |

A flask, containing an agitator and a reflux condenser was charged with the above ingredients and the mixture then heated at reflux (62–67° C.) for two hours. 4.5 parts of alpha methyl styrene then was added. The reaction subsided immediately. This mixture was analyzed and found to contain polymer equivalent to 35.5% monomer conversion. Residual vinyl acetate was distilled off over a period of 10 hours at a temperature of 60–70° C. The mixture then was reanalyzed and found to contain no additional polymer. The polyvinyl acetate resulting was of good color, of uniform molecular weight, and upon hydrolysis yielded a polyvinyl alcohol of excellent quality.

EXAMPLE II

*Ethylene/vinyl acetate copolymerization terminated with alpha methyl styrene*

| | Parts |
|---|---|
| Vinyl acetate | 159.0 |
| Water | 179.3 |
| Sodium bicarbonate | 0.1 |
| Hydrogen peroxide | 0.06 |
| Starch | 0.85 |

The components listed above were charged into a stainless steel pressure vessel and heated therein at 70° C. for two hours while under an ethylene pressure of 80 p. s. i. 0.75 part of alpha methyl styrene then was added, causing immediate cessation of the reaction. Residual vinyl acetate monomer and alpha methyl styrene were removed by distillation. Comonomer to copolymer conversion was found to be approximately 85%.

This copolymer was characterized by exceptional uniformity.

EXAMPLE III

*Vinyl acetate polymerization terminated with styrene*

|  | Parts |
|---|---|
| Vinyl acetate | 750.0 |
| Methanol | 250.0 |
| Benzoyl peroxide | 1.5 |

A flask, provided with an agitator, a reflux condenser and a calibrated viscosimeter, was charged with the above ingredients. The mixture was heated at 59–60° C. for 177 minutes. In order to follow more closely the progress of the polymerization reaction, at various intervals during the reaction period a sample of the reaction mixture was drawn into the viscosimeter and the viscosity measured (viscosity being a measure of the degree of polymerization). 3.75 parts of styrene then was added and the reaction subsided immediately. Heating was continued for a further period of 23 minutes with continued measurement of viscosity and no increase in viscosity was noted. 34.9% of the monomer was converted to polymer. The polymer was of excellent uniformity and color.

Referring to the drawing, the figure depicts a plot of time of reaction versus viscosity in seconds as taken from Example III and illustrates the highly satisfactory effect of styrene in terminating the polymerization reaction. All viscosity measurements were made at a temperature of 59.5° C.±0.5° C., each viscosity reported being an average of several readings taken from a given sample of the reaction mixture.

It will be understood that the above examples and drawing are merely illustrative in showing specific embodiments and that the invention broadly comprises subjecting a liquid vinyl ester to polymerization conditions in the presence of a catalyst, then substantially terminating the polymerization reaction after partial polymerization of the liquid vinyl ester by adding to the reaction mixture a compound from the group consisting of styrene and substituted styrene.

The present invention is applicable to the polymerization of liquid vinyl esters in general and is particularly suitable to the liquid vinyl esters of mono-carboxylic acids, examples of which include vinyl acetate, vinyl propionate, vinyl butyrate, vinyl benzoate and the like. This invention is equally applicable to copolymerizations of a liquid vinyl ester with other polymerizable materials in which the liquid vinyl ester is the major component. Such other polymerizable materials include ethylenically unsaturated aliphatic compounds such as mono-olefines, e. g. ethylene, acrylic and substituted acrylic acids and derivatives thereof, or halogen-containing compounds, e. g. vinyl chloride.

My preferred means for conducting the novel process described in this invention comprises the use of styrene or alpha-methyl styrene to substantially terminate liquid vinyl ester polymerization. However, I have found that other substituted styrenes also serve to stop such polymerization. Examples of other operable substituted styrenes are alpha ethyl styrene, alpha propyl styrene, alpha butyl styrene, alpha pentyl styrene, and other members of this series as well as ring substituted styrenes, e. g. ortho methyl styrene, meta methyl styrene, and para methyl styrene.

Concentrations of styrene or substituted styrene below 0.05% slow the polymerization of liquid vinyl esters, but fail to substantially terminate the reaction as required by this invention. Consequently concentrations of styrene or substituted styrene should be in excess of 0.05%. For practical reasons it is preferred that the concentration lie within the limits of 0.10%–1.50%. There is no critical upper limit on the concentration of styrene or substituted styrene. Styrene or substituted styrene concentration is based upon the weight of monomeric liquid vinyl ester employed.

The reaction may be terminated by addition of styrene or substituted styrene at any time after polymerization of the liquid vinyl ester monomer commences, but should be terminated before 90% conversion of the original liquid vinyl ester monomer to polymer. I have learned that the full benefits of this invention are not completely realized if the reaction is terminated after 90% conversion of monomer to polymer.

Polyvinyl esters produced according to this invention may be used in any of the various applications for polyvinyl esters known to the art. Thus, polymers prepared by the process of the present invention have been found especially useful as intermediates in the preparation of polyvinyl alcohol and polyvinyl acetals. Resins, e. g. safety glass grade polyvinyl acetal, prepared from the polyvinyl esters of this invention are characterized by excellent reproducible quality and improved toughness.

As many apparently widely different embodiments of this invention may be made without departing from the spirit and scope thereof, it is to be understood that the invention is not limited to the specific embodiments thereof except as defined in the appended claims.

I claim:

1. In a process of preparing vinyl polymers which comprises subjecting a liquid vinyl ester of a monocarboxylic acid to polymerization conditions in the presence of a polymerization catalyst, the step comprising adding to the polymerization reaction after partial polymerization at least 0.05% by weight based on the monomeric liquid vinyl ester being used, of a compound from the group consisting of styrene and alkyl substituted styrene, whereby the said reaction is terminated.

2. In a process of preparing vinyl polymers which comprises subjecting a liquid vinyl ester of a monocarboxylic acid to polymerization conditions in the presence of a polymerization catalyst the step comprising adding to the polymerization reaction after partial polymerization at least 0.05% by weight based on the monomeric liquid vinyl ester being used, of an alpha-alkyl substituted styrene, whereby the said reaction is terminated.

3. In a process of preparing vinyl polymers which comprises subjecting a liquid vinyl ester of a monocarboxylic acid to polymerization conditions in the presence of a polymerization catalyst the step comprising adding to the polymerization reaction after partial polymerization at least 0.05% by weight based on the monomeric liquid vinyl ester being used, of an alpha-methyl styrene, whereby the said reaction is terminated.

4. In a process of preparing vinyl polymers which comprises subjecting a liquid vinyl ester of a monocarboxylic acid to polymerization conditions in the presence of a polymerization catalyst the step comprising adding to the polymerization reaction after partial polymerization at least 0.05% by weight based on the monomeric liquid vinyl ester being used, of styrene, whereby said reaction is terminated.

5. In a process of preparing vinyl acetate polymers which comprises subjecting the vinyl acetate monomer to polymerization conditions in the presence of a polymerization catalyst the step comprising adding to the polymerization reaction after partial polymerization at least 0.05% by weight based on the vinyl acetate monomer being used, of a compound from the group consisting of styrene and alkyl substituted styrene, whereby the said reaction is terminated.

6. In a process of preparing vinyl acetate polymers which comprises subjecting the vinyl acetate monomer to polymerization conditions in the presence of a polymerization catalyst, the step comprising adding to the polymerization reaction after partial polymerization at least 0.05% by weight based on the vinyl acetate monomer being used, of styrene, whereby the said reaction is terminated.

7. In a process of preparing ethylene/vinyl acetate copolymer which comprises subjecting to polymerization conditions in the presence of a polymerization catalyst an ethylene/vinyl acetate comonomer having vinyl acetate as a major component, the step comprising adding to the said polymerization reaction after partial polymerization of said comonomer at least 0.05% by weight of the vinyl acetate comonomer component a compound from the group consisting of styrene and alkyl substituted styrene, whereby the said reaction is terminated.

8. In a process of preparing ethylene/vinyl acetate copolymer which comprises subjecting to polymerization conditions in the presence of a polymerization catalyst ethylene/vinyl acetate comonomer having vinyl acetate as the major component, the step comprising adding to the said polymerization reaction after partial polymerization of the said comonomer at least 0.05% by weight of the vinyl acetate comonomer component of an alpha methyl styrene, whereby said reaction is terminated.

JESSE O. WHITE.

REFERENCES CITED

The following references are of record in the file of this patent:

FOREIGN PATENTS

| Number | Country | Date |
| --- | --- | --- |
| 835,357 | France | Dec. 20, 1938 |

OTHER REFERENCES

"Modern Plastics," Barron, 1945, New York, pages 85 and 86.